United States Patent [19]
Orsat et al.

[11] Patent Number: 5,973,472
[45] Date of Patent: Oct. 26, 1999

[54] SINGLE-PHASE ASYNCHRONOUS MOTOR WITH TWO WINDINGS

[75] Inventors: Jean-Michel Orsat, Chatillon sur Cluses, France; Serge Bruno, Marnaz, France

[73] Assignee: Somfy, Cluses, France

[21] Appl. No.: 09/162,473

[22] Filed: Sep. 28, 1998

[30] Foreign Application Priority Data

Oct. 20, 1997 [FR] France .................................. 97-13109

[51] Int. Cl.⁶ ..................................................... H02P 1/42
[52] U.S. Cl. ........................... 318/781; 318/782; 318/786
[58] Field of Search ..................... 318/727, 728, 318/778, 781, 782, 785, 786, 789, 794, 797

[56] References Cited

U.S. PATENT DOCUMENTS

| | | | |
|---|---|---|---|
| 4,520,303 | 5/1985 | Ward | 318/778 |
| 4,672,284 | 6/1987 | Ward | 318/752 |
| 5,483,139 | 1/1996 | Welles, II | 318/782 |

FOREIGN PATENT DOCUMENTS

| | | |
|---|---|---|
| 0 596 472 | 5/1994 | European Pat. Off. . |
| 40 38 199 A1 | 6/1992 | Germany . |

*Primary Examiner*—Bentsu Ro
*Attorney, Agent, or Firm*—Robert F.I. Conte; John Moetteli

[57] ABSTRACT

A motor whose stator is equipped with a main winding (DP) and with an auxiliary winding which consists of two half-windings (B1, B2) that are wound in opposite directions and is supplied through a full-wave rectifier (GR) and by means of two commutating switches (T1, T2) controlled by a control circuit (COM) which alternately closes the switches at a frequency equal to the frequency of the supply voltage. The motor comprises, in parallel with the half-windings, at least one device (DAP) which limits the voltage across the terminals of the switches when they are opened, to a value higher than the supply voltage.

14 Claims, 4 Drawing Sheets

Fig 4
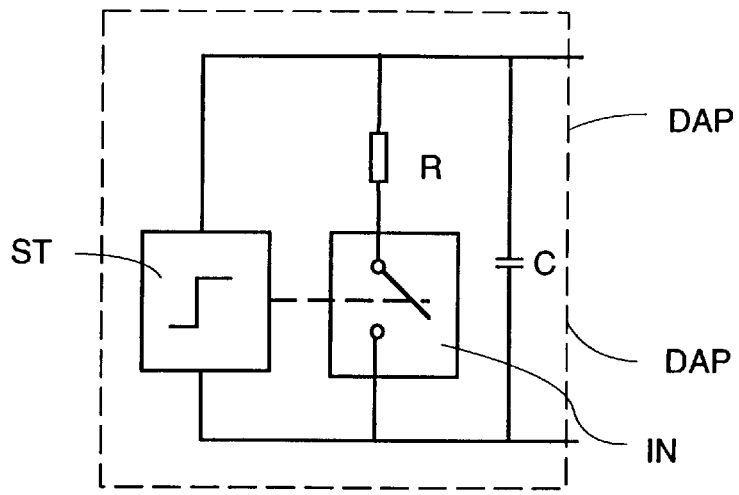
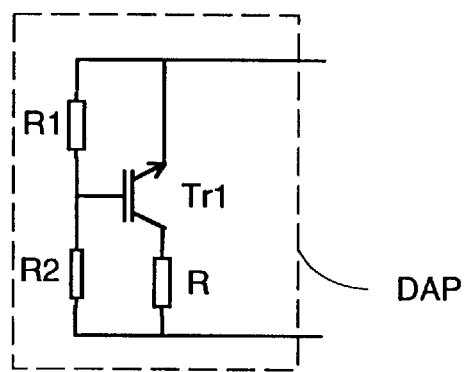
Fig 5
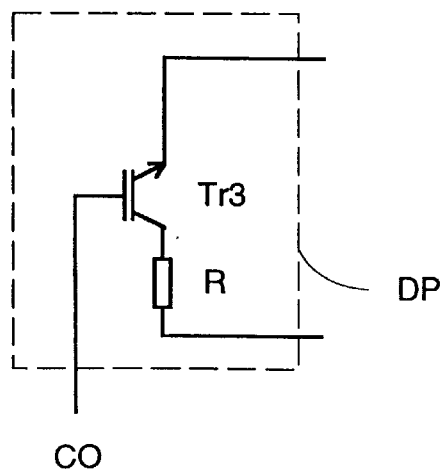
Fig 7

5,973,472

SINGLE-PHASE ASYNCHRONOUS MOTOR WITH TWO WINDINGS

FIELD OF THE INVENTION

The present invention relates to a single-phase asynchronous induction motor whose stator is equipped with a main winding and with an auxiliary winding which consists of two half-windings that are wound in opposite directions, so that a current of given direction creates magnetic fields of opposite directions in these half-windings, the main winding being supplied directly by an alternating current source, while the auxiliary winding is supplied by means of a current delivered by a full-wave rectifier and by means of two commutating switches, respectively in series with each of the auxiliary half-windings, these switches being controlled by a control circuit which alternately closes/opens the switches at a frequency equal to the frequency of the supply voltage, in order to generate, in the auxiliary winding, an alternating voltage phase-shifted by 90° relative to the voltage in the main winding.

PRIOR ART

A motor of this type is disclosed by U.S. Pat. No. 4,520,303. When one of the switches is opened, the current in the winding corresponding to this switch tends to be sustained, causing an overvoltage across the terminals of this half-winding, which overvoltage is also found in the other half-winding because of the mutual inductive coupling between the two half-windings. This overvoltage is also found across the terminals of the switch which has just been opened. Since the switches generally consist of semiconductor elements that can withstand only limited voltages, the overvoltage appearing across the terminals of the switches destroys them in most figurative cases. Usually, in order to discharge the current due to a cutoff overvoltage in a coil, it is sufficient to connect a free wheel diode in parallel with this coil. However, in the case of two windings which are magnetically coupled, a free wheel diode of this type would be seen as a short circuit by the other coil. This is because, when this other coil is being supplied, it will be coupled to a coil in series with a forward-biased diode.

One solution to this problem could consist in using, as a device for discharging the current, a transile diode, that is to say a diode of the zener type, placed with its anode next to the negative pole of the diode bridge and with its cathode next to the half-windings of the motor. The reverse conduction threshold of this diode would have to be higher than the voltage output by the diode bridge. For example, for a motor rated at 230 V rms, the threshold voltage would be 600 V. This current discharge device could act in the same way in parallel with each of the half-windings. A current discharge device of this type would, once its threshold had been defined, be designed to dissipate the thermal power resulting from the flow of current at a voltage equal to its threshold voltage. For small motors, rated at a few tens of watts, it is possible to find discharge components, because the power to be dissipated remains less than 2 watts. However, for more powerful motors, rated at hundreds of watts, the power to be dissipated by the discharge component becomes too great and there is no commercially available component.

SUMMARY OF THE INVENTION

The object of the present invention is to solve the problem presented above for motors of any power.

The asynchronous induction motor according to the invention is one which comprises in parallel with the two windings, at least one device which limits the voltage across the terminals of the commutating switches, when these switches are opened, to a value higher than the supply voltage.

Since the limit value is higher than the supply voltage, the limitation device does not constitute a short circuit seen by the other half-winding.

If necessary, the voltage limitation device comprises components such as a capacitor and/or resistor capable of discharging heavy currents.

Depending on the embodiment, it is possible to provide one voltage limiter device for each half-winding, or a single voltage limiter device common to the two half-windings, one of the terminals of the device being connected to those terminals of the half-windings that are not in common via oppositely biased diodes.

According to one embodiment, the voltage limiter device is a device which short-circuits the half-winding across whose terminals an overvoltage is produced when its associated commutating switch is opened. This device consists, for example, of a voltage-threshold element and of a switch which is controlled by this voltage-threshold element. The switch consists, for example, of a transistor, and the voltage-threshold element consists of the base-emitter junction of the transistor and of a voltage divider connected in parallel with the half-windings.

The voltage limiter device may either be self-driven or driven by a controller.

The addition of a capacitor in parallel with the half-windings makes it possible to absorb the current surges when the switches are operated.

According to another embodiment, the voltage limiter device consists of a resistor and of a capacitor in parallel with the half-windings. In view of the power dissipation of an embodiment of this type, it will generally be reserved for large motors.

BRIEF DESCRIPTION OF THE DRAWINGS

The appended drawing represents, by way of example, a few embodiments of the motor according to the invention.

FIG. 4 represents the general scheme of a first embodiment of the devices DAP of FIGS. 1 and 2.

FIG. 5 represents a first illustrative embodiment of the general scheme of FIG. 4.

FIG. 7 represents an illustrative embodiment of the device DP of FIG. 3.

DESCRIPTION OF THE PREFERRED EMBODIMENTS

Figure 1:
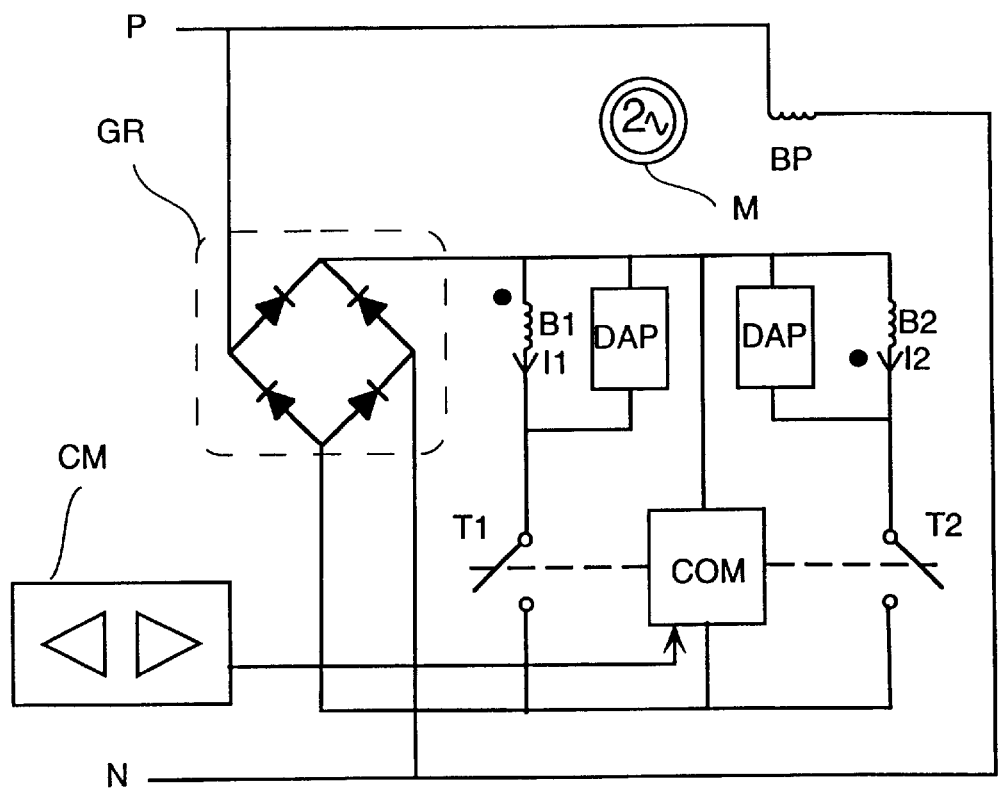
FIG. 1 is a general scheme of a motor according to the invention, which may have a variety of embodiments.

In FIG. 1, the motor M is schematically represented by its main winding BP, to which an alternating voltage is applied, for example the voltage from the mains which is denoted by its phase P and the neutral N, and by its two auxiliary half-windings B1 and B2 that are wound in opposite directions as indicated in the drawing. The half-windings B1 and B2 are supplied alternately by currents I1 and I2 which flow through the half-windings in the direction indicated by the arrows, by means of a diode-bridge rectifier circuit GR. The common point of the two half-windings B1, B2 is connected to one of the outputs of the diode bridge and to a control circuit COM, while the other terminals, which are not in common, of the half-windings B1, B2 are respectively connected to the other output of the diode bridge through a switch T1, T2, respectively, the switches being controlled by the control circuit COM, which is also supplied by the diode bridge GR. In the example which is represented, the control circuit COM is also connected to a manual control CM allowing the rotation of the motor to be set in one direction or the other. The control circuit COM may be embodied in a different known way, for example as described in U.S. Pat. No. 4,520,303.

Figure 8A:
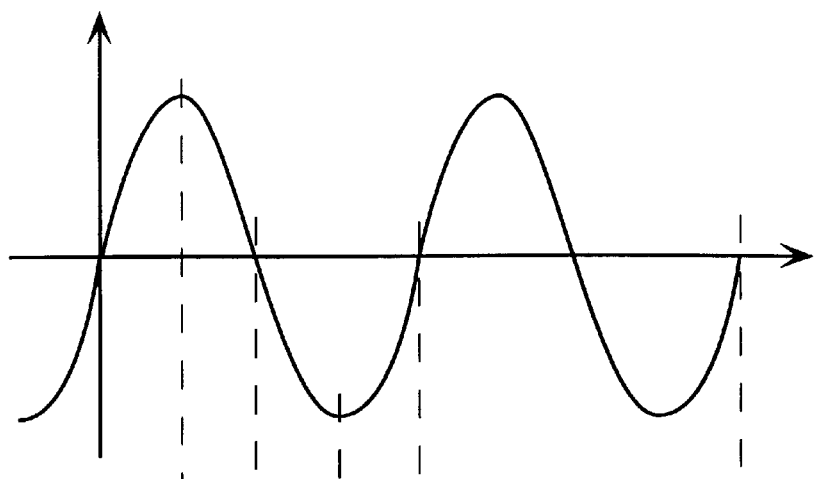
FIG. 8a represents the waveform of the supply voltage across the terminals of the main winding DP of the motor.
Figure 8B:
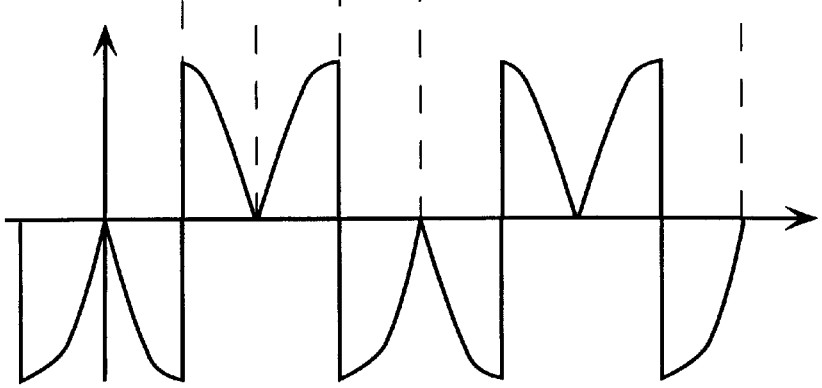
FIG. 8b represents the waveform of the voltage seen by the double auxiliary winding in the case of a low-power motor.

The control circuit COM alternately closes/opens the switches T1 and T2 in order to obtain, in the half-windings B1 and B2, a current whose voltage waveform is represented in FIG. 8b, as is described in U.S. Pat. No. 4,520,303.

A self-driven device DAP which limits the voltage across the terminals of the switches T1 and T2 is connected in parallel with each of the half-windings B1 and B2.

Figure 2:
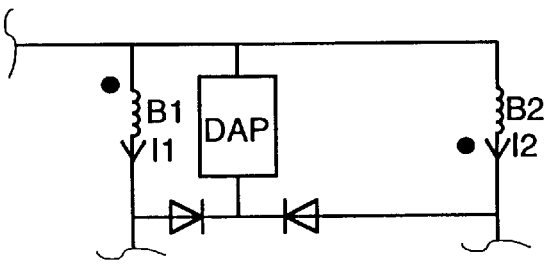
FIG. 2 is a first variant of the general scheme in FIG. 1.

In conventional fashion, as represented in FIG. 2, the two self-driven devices DAP of FIG. 1 may be replaced by a single device DAP common to the two half-windings B1 and B2, by connecting the terminal of the device DAP that is not common to the two half-windings via two opposed diodes to its two terminals that are not in common, these diodes being forward-biased in the direction of the currents I1 and I2.

Figure 3:
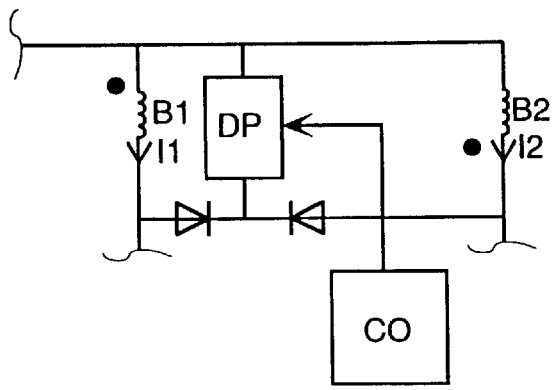
FIG. 3 is a second variant of the general scheme in FIG. 1.

Instead of a self-driven device, it is possible to use a driven voltage limiter device DP, as represented in FIG. 3, this device DP being driven by a controller CO. This controller may be embodied in conventional fashion by means of a random-access memory, a read-only memory, a processing unit, a clock and interfaces.

The self-driven device DAP may be embodied in various ways. Preferably, the device DAP will be embodied according to the general scheme represented in FIG. 4, that is to say by means of a voltage-threshold element ST, and a switch IN which is controlled by the threshold element ST and is in series with a resistor R. The voltage-threshold element ST triggers the closure or opening of the switch IN depending on whether or not the voltage threshold is crossed. The voltage threshold is chosen higher than the supply voltage. When the switch IN closes, the corresponding half-winding is short-circuited through the resistor R, in which the energy stored in the half-winding is dissipated.

Each time T1, T2 are operated, the current flowing through the half-winding whose switch has just been opened, and the resistor R, induces an extra current in the other half-winding, which results in an undesirable current surge. In order to overcome this drawback, the self-driven device DAP may be supplemented by a capacitor C in parallel with the half-windings, the effect of which capacitor is to absorb the current surge. The value of this capacitor is of the order of 1.5 to 2.2 $\mu$F.

A first embodiment of the general scheme represented in FIG. 4 is represented in FIG. 5. The voltage-threshold element ST consists of a voltage divider formed by resistors R1 and R2. The switch IN consists of a transistor Tr1 whose base is connected to the voltage divider.

Figure 6:
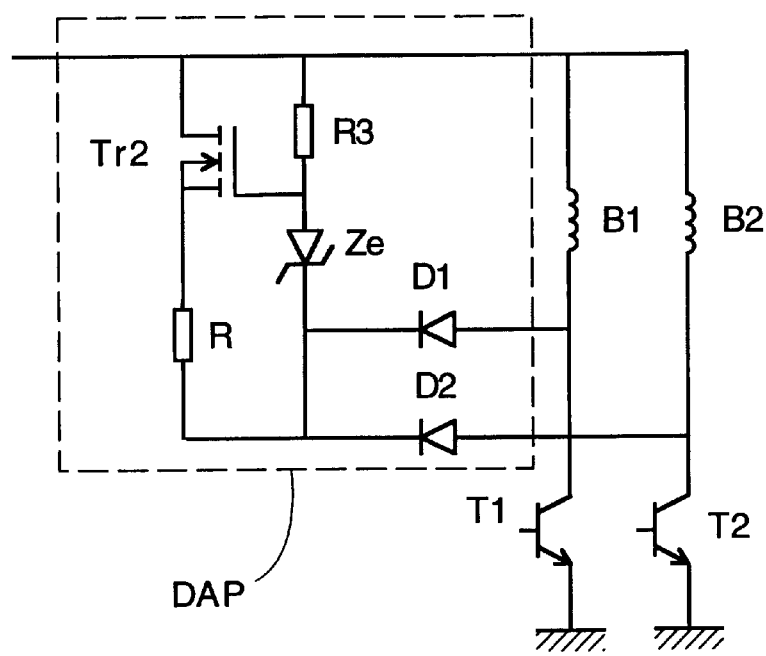
FIG. 6 represents a second illustrative embodiment of the general scheme of FIG. 4.

Another embodiment of the scheme of FIG. 4 is represented in FIG. 6. The voltage-threshold element ST consists of a zener diode Ze which is in series with a resistor R3 and is connected to each of the half-windings B1 and B2 through a diode D1, D2, respectively, ensuring that the zener diode operates correctly. The switch IN consists of a field-effect transistor Tr2. The switches T1 and T2 here consist of transistors.

An illustrative embodiment of the driven device DP of FIG. 3 is illustrated in FIG. 7. It consists simply of a transistor Tr3 in series with the resistor R.

Figure 8C:
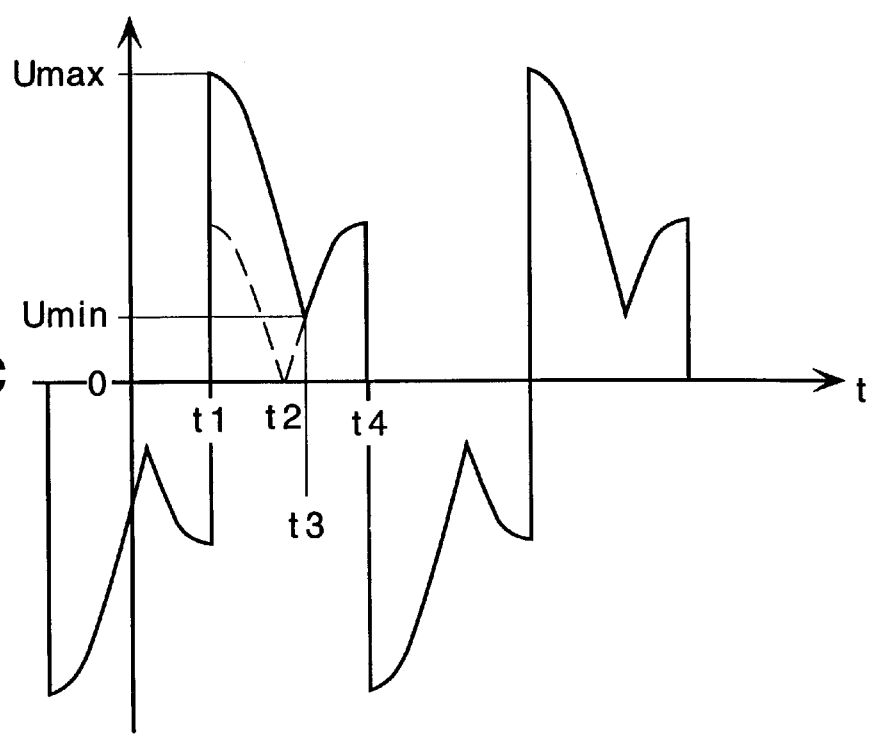
FIG. 8c represents the waveform of the voltage seen by the double auxiliary winding in the case of a high-power motor.

FIG. 8c represents the waveform of the voltage seen by the double auxiliary winding B1, B2 in the case of a high-power motor equipped with the voltage limiter device according to the invention. Umax is the value at which the voltage across the terminals of a half-winding is limited by the device according to the invention. Umax is higher than the supply voltage.

One beneficial effect emerges from the diagram represented in FIG. 8c, in which t1 and t4 are the times at which the switching takes place. It can be seen that the voltage across the terminals of a half-winding does not fall to zero when the supply voltage passes through zero, that is to say during a quarter-cycle of the voltage in the double auxiliary winding. This is due to the fact that some of the energy of the half-winding B1, B2 whose supply has just been cut off is transferred by induction to the other half-winding, which has just been connected to the supply. The effect of this transfer is to shift from t2 to t3 the time when the next eighth-cycle supplies this half-winding, and it has the advantage of eliminating the zero-crossing of the torque transmitted to the rotor and consequently of ensuring quieter running and of giving the motor a higher specific power than if it were supplied according to the prior art.

Figure 9:
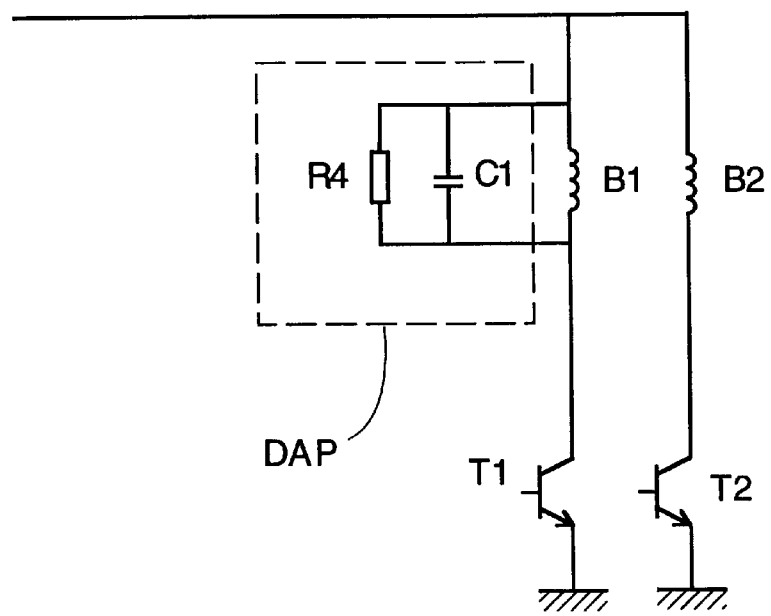
FIG. 9 represents another embodiment of the limiter device for the voltage across the terminals of the switches.

FIG. 9 represents another embodiment of the self-driven device DP, which can be used in the case when a high power dissipation level is acceptable, for example in the case of large motors. The device DAP simply consists of a capacitor C1 and a resistor R4 in parallel with each of the half-windings B1 and B2. The value of the capacitor is of the order of 1.5 $\mu$F to 2.2 $\mu$F. An appreciable amount of the auxiliary current is dissipated in the resistor R4. When the voltage across the terminals of the half-winding B1 increases abruptly, the capacitor C1 acts in short circuit and charges before subsequently discharging through R4.

We claim:

1. A single-phase asynchronous induction motor whose stator is equipped with a main winding (BP) and with an auxiliary winding which consists of two half-windings (B1, B2) that are wound in opposite directions, so that a current of given direction creates magnetic fields of opposite directions in these half-windings, the main winding (BP) being supplied directly by an alternating current source, while the auxiliary winding is supplied by means of a current delivered by a full-wave rectifier (GR) and by means of two commutating switches (T1, T2), respectively in series with each of the auxiliary half-windings, these switches being controlled by a control circuit (COM) which alternately closes/opens the switches (T1, T2) at a frequency equal to the frequency of the supply voltage, in order to generate, in the auxiliary winding, an alternating voltage phase-shifted by 90° relative to the voltage in the main winding, which motor comprises, in parallel with the two half-windings, at least one device (DAP; DP) which limits the voltage across the terminals of the commutating switches (T1, T2), when these switches are opened, to a value higher than the supply voltage.

2. The motor as claimed in claim 1, which comprises two voltage limiter devices (DAP), one for each half-winding.

3. The motor as claimed in claim 2, wherein the voltage limiter device consists of a resistor (R4) and of a capacitor (C1) in parallel with each of the half-windings.

4. The motor as claimed in claim 1, which comprises a single voltage limiter device (DAP, DP) common to the two half-windings, one of the terminals of the device being connected to those terminals of the half-windings that are not in common via oppositely biased diodes.

5. The motor as claimed in claim 1, wherein the voltage limiter device (DAP) is a device (FIG. 4; FIG. 5) which short-circuits the half-winding across whose terminals an overvoltage is produced when its associated commutating switch is opened.

6. The motor as claimed in claim 5, which comprises at least one self-driven voltage limiter device and wherein the device which short-circuits the half-winding consists of a voltage-threshold element (ST) and of a switch (IN) which is controlled by this voltage-threshold element.

7. The motor as claimed in claim 6, wherein the switch consists of a transistor (Tr1), and the voltage-threshold element consists of the base-emitter junction of the transistor and of a voltage divider (R1, R2) connected in parallel with the half-winding.

8. The motor as claimed in claim 6, wherein the switch consists of a transistor (Tr2), and the voltage-threshold element consists of a zener diode (Ze).

9. The motor as claimed in claim 5, which further comprises a capacitor (C) in parallel with each of the half-windings to absorb the current surges when the switches are operated.

10. The motor as claimed in claim 1, which comprises at least one self-driven voltage limiter device.

11. The motor as claimed in claim 10, wherein the device which short-circuits the half-winding consists of a voltage-threshold element (ST) and of a switch (IN) which is controlled by this voltage-threshold element.

12. The motor as claimed in claim 11, wherein the switch consists of a transistor (Tr1), and the voltage-threshold element consists of the base-emitter junction of the transistor and of a voltage divider (R1, R2) connected in parallel with the half-winding.

13. The motor as claimed in claim 11, wherein the switch consists of a transistor (Tr2), and the voltage-threshold element consists of a zener diode (Ze).

14. The motor as claimed in claim 1, which comprises at least one voltage limiter device (DP) which is driven by a controller (CO).

* * * * *